United States Patent [19]
Hove

[11] Patent Number: 5,522,989
[45] Date of Patent: Jun. 4, 1996

[54] DEVICE FOR AERATING WASTE WATER

[75] Inventor: Dirk T. Hove, Mr Hooglanderveen, Netherlands

[73] Assignee: Hubert B.V., Stavoren, Netherlands

[21] Appl. No.: 135,170

[22] Filed: Oct. 12, 1993

[30] Foreign Application Priority Data

Oct. 14, 1992 [NL] Netherlands ............... 92.01782

[51] Int. Cl.⁶ .................. C02F 3/16; B01F 3/04
[52] U.S. Cl. .............. 210/219; 261/91; 416/184
[58] Field of Search ................. 210/219, 771.1; 261/91–93; 416/183–185, 186 R, 189

[56] References Cited

U.S. PATENT DOCUMENTS

| | | | |
|---|---|---|---|
| 3,154,601 | 10/1964 | Kalinske et al. | 261/93 |
| 3,360,460 | 12/1967 | Weston | 210/63 |
| 3,741,682 | 6/1973 | Robertson | 261/91 |
| 4,074,953 | 2/1978 | Budde et al. | 261/91 |
| 4,123,482 | 10/1978 | Wyatt et al. | 261/91 |
| 4,151,231 | 4/1979 | Austin et al. | 261/91 |

FOREIGN PATENT DOCUMENTS 6903806  9/1970  Netherlands.

*Primary Examiner*—Thomas Wyse
*Attorney, Agent, or Firm*—Curtis, Morris & Safford

[57] ABSTRACT

A method for aerating waste water, wherein the interface area between air and waste water is enlarged by splashing the water by means of blades and wherein the sludge present in the waste water is kept in suspension by creating flows and/or turbulence in the water. The waste water is set in motion by moving a plurality of blades arranged in a circle through the waste water, in such a manner that the connecting parts interconnecting the blades substantially do not extend into the waste water. The device for aerating waste water is provided with a container for waste water and with a rotor being rotatable about a substantially vertical axis, whose portion pointing downwards may extend into the waste water. The rotor comprises blades having surfaces which are substantially radially and axially oriented, whereby the blade surfaces are at least partially located below the rotor parts interconnecting the blades so that the connecting parts substantially do not extend into the waste water.

7 Claims, 1 Drawing Sheet

DEVICE FOR AERATING WASTE WATER

FIELD OF THE INVENTION

The invention relates to a device and a method for aerating waste water. The device is provided with a container for waste water having a rotor rotatable about a substantially vertical axis having a portion pointing downwards which may extend into the waste water.

BACKGROUND OF THE INVENTION

In waste water treatment, surface aerators are known. They are often used in an aerating tank of an active sludge installation and their purpose is to dissolve oxygen in the water, thus providing the micro organisms in the aerating tank with oxygen.

Transfer of oxygen mainly takes place at the interface between air and water, and an optimum transfer of oxygen of air to water is obtained by making the interface area as large as possible. Furthermore, the transfer of oxygen is promoted by keeping the oxygen content near the interface in the water as low as possible, because the higher the oxygen content of the water at the interface the more difficult it becomes to dissolve oxygen in water. Consequently, it is more important that the water near the interface be quickly renewed.

The amount of energy required for aerating constitutes the larger portion of the energy consumption of a waste water purification plant. It is of paramount importance, therefore, that the amount of oxygen dissolved in the water per energy unit (the oxygen input efficiency) is as large as possible.

The regulation of the oxygen input capacity of a surface aerator provided with a rotor which agitates the water takes place by changing the immersion depth and/or the speed of revolutions of the rotor. The immersion depth range of the surface aerator must be sufficiently large to cope with the normal variations in the water level of an aerating tank, while maintaining a high oxygen input efficiency. The speed range within which a high oxygen input efficiency is achieved should likewise be as wide as possible, so that the highest possible oxygen input efficiency is achieved, both when a large amount of oxygen is put in and when less oxygen is put in.

OBJECTS OF THE INVENTION

An object of the invention is to provide a method and apparatus to aerate waste water with a high oxygen input efficiency.

Another object of the invention is to provide a method and apparatus obtaining a high and nearly constant oxygen input efficiency over a wide immersion depth range and a wide speed range.

Still another object of the invention is to provide a method and apparatus to develop sufficient flow velocity and turbulence in the waste water for keeping the sludge in suspension and in contact with the dissolved oxygen.

Yet another object of the invention is to provide a method and apparatus to aerate waste water in such a manner, that the forces generated remain limited, so that it is possible to use a relatively light construction for the installation.

Another object of the invention is to provide a device for aerating waste water, which is relatively insensitive to fouling, in particular to substances, materials and material waste present in the waste water which may become attached to the rotor.

SUMMARY OF THE INVENTION

In order to accomplish these and other objects the device for aerating waste water according to the present invention comprises a rotor, which includes blades having surfaces which are substantially radially and axially oriented, whereby the blade surfaces are at least partially located below the rotor parts interconnecting the blades so that the connecting parts substantially do not extend into the waste water.

According to a further aspect of the invention the blades may consist, at least partially so, of plate-shaped portions located at some distance from the axis of rotation of the rotor, which portions may have a width, seen in radial direction, of 0.07 to 0.3 times the outside diameter of the rotor. The width of the plate-shaped portions of the blades may decrease in downward direction thereby.

According to a further aspect of the invention the blades may be interconnected by a substantially horizontal plate-shaped part, near the edge of which the blades are secured. In that case the blades may extend on either side of the horizontal plate-shaped part, whereby the height of the blades may be 0.05 to 0.3 times the outside diameter of the rotor.

According to the invention the plate-shaped portion of the blade may blend at its upper side into a portion bent in the direction of rotation of the blade, which portion slopes upwards in an outward direction. In order to stiffen the construction the bent portion may be connected at the radially inward side to the connecting parts interconnecting the blades, for example the horizontal plate-shaped part. The term "bent portion" is understood to mean a portion of the blade which is inclined at an angle to the plate-shaped portion of the blade. The bent portion may be a loose part, which is secured to the other portion of the blade.

The invention furthermore relates to a method for aerating waste water, wherein the interface area between air and waste water is enlarged by splashing the water by means of blades and wherein the sludge present in the waste water is kept in suspension by creating flows and/or turbulence in the water, whereby the waste water is set in motion by moving a plurality of blades arranged in a circle through the waste water, in such a manner that the connecting parts interconnecting the blades substantially do not extend into the waste water.

In order to more fully explain the invention an embodiment of the rotor for aerating waste water will be described below with reference to the drawing.

DETAILED DESCRIPTIONS OF THE PREFERRED EMBODIMENTS

Figure 1:
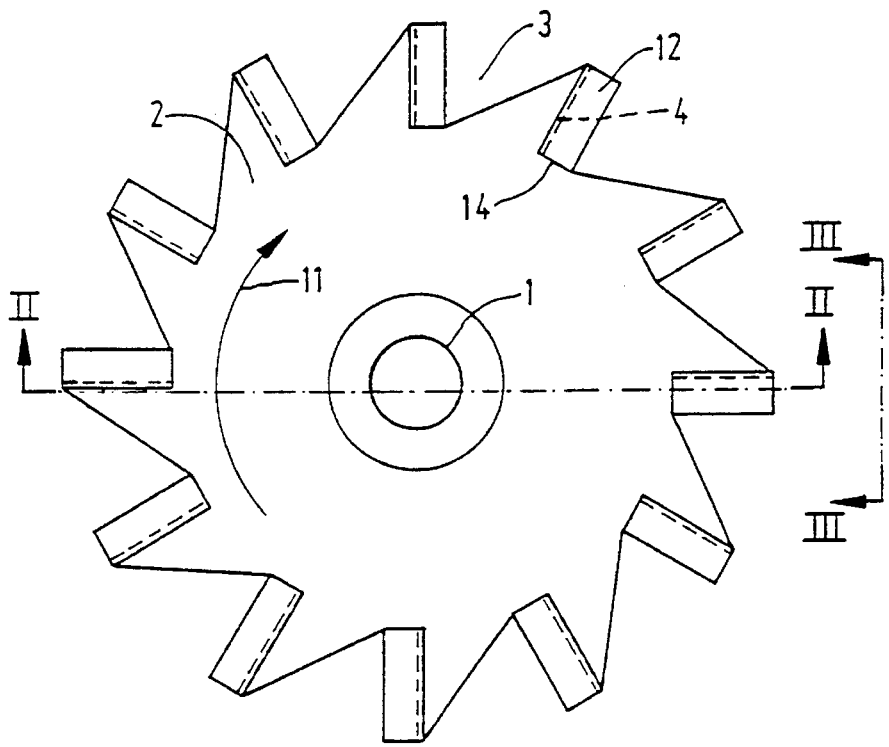
FIG. 1 is a plan view of a rotor.
Figure 2:
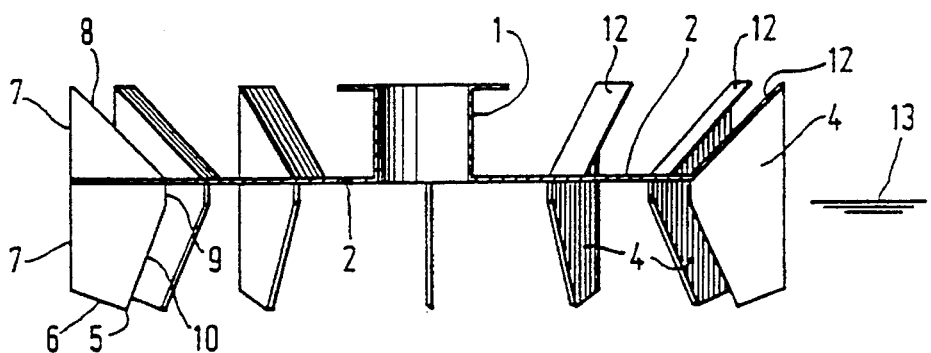
FIG. 2 is a sectional view along the line II—II in FIG. 1.
Figure 3:
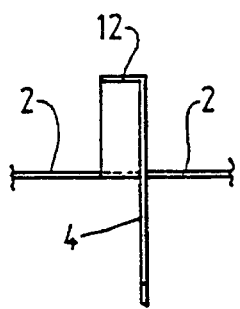
FIG. 3 is a view along the line III—III in FIG. 1.

The Figures are only schematic illustrations of a rotor for aerating waste water. The rotor is provided with a central shaft 1, to which a plate 2 is perpendicularly secured thereto. The shaft 1 may be connected at its upper side to a rotor driving mean. A plurality of recesses 3, 12 in the present embodiment, are provided in the outer edge of the plate 2, within which blades 4 are located. The blades 4 are plate-shaped and have a lowermost point 5, an edge 6 sloping upwardly and outwardly, which blend into a vertical edge 7 extending up to above the plate 2. The blades 4 also have an edge 8, which extends inwardly and downwardly to the plate 2, and edge 9, which extends vertically downwardly from the plate 2, and an edge 10, which extends downwardly and outwardly to the lowermost point 5.

A plate 12 is secured along the entire upper edge 8 in the direction of rotation 11 of the rotor. Plate 12 is secured at a certain angle, 90° in the present embodiment, to the blade 4. The plate 12 may also be formed by bending the plate-shaped material, from which the blade 4 is made, in the direction of rotation of the rotor at the edge 8.

In order to stiffen the attachment of the blade to the plate-shaped part 2, plate 12 may be welded to the plate-shaped part 2 at an edge 14, or be secured thereto in any other manner, so that a stiff and solid connection between the blade and the plate-shaped part 2 is obtained.

The lowermost portions of the rotor blades 4 extend into the waste water, and by rotating the rotor as indicated by the arrow 11 the waste water is agitated. Preferably the rotor rotates at a velocity of 2 to 7 meters per second. Thus an upward flow against the blade 4 is created, whereby the flow is deflected at a certain angle by the plate 12. The water falls back into the waste water 13 at some distance from the blade. This creates a turbulence, whereby air bubbles are formed, resulting in a high amount of interface renewal of the water.

The shape of the rotor with the blades 4 is such, that the lowermost portion of the blades extends into the waste water 13, while the plate-shaped part 2 connecting the blades 4 together and to the rotor is located at a level above the surface of the waste water 13, in such a manner that there is no or virtually no contact between the plate-shaped part and the waste water. This reduces the amount of energy required for rotation, so that a higher oxygen input efficiency is obtained. Moreover, this construction precludes additional forces to be exerted on the rotor. In particular, upward forces that might be produced if the shape of the rotor would be such that the horizontal plate-shaped part interconnecting the blades is located on or in the water. Such undesirable forces would be transmitted via the rotor shaft to the gear box driving the rotor, in which case the gear box would have to be constructed of extra solid material to withstand these additional forces. Since the plate-shaped part 2 is located above the water surface 13, the rotor drive may be constructed of lighter materials and the drive will have a longer life. Preferably, the distance between the water surface and the plate-shaped part 2 is at least 0.025 times the diameter of the rotor.

The rotor is insensitive to fouling and is self-cleaning, due to the arrangement and the shape of the blades and due to the fact that the portion of the rotor extending into the waste water is kept as small as possible.

Of course the invention is not limited to the illustrated embodiment. It will be apparent to those skilled in the art that in addition to many other variations it is possible to not provide the plate 12 on every blade 4, but on for example every other blade 4. Thus the water will be splashed by the rotor over a larger area. A similar effect may be obtained by varying the angle at which the edge 8 of the blade 4 meets the plate 2 for all or for some of the blades 4. Also the orientation of the blades 4 with respect to the shaft 1 may be varied. The blades 4, which are radially oriented in the present embodiment, may also be somewhat tangentially oriented or have another orientation deviating from the radial orientation. It is not necessary that all the blades have the same orientation thereby, but they may have different orientations in order to achieve an optimum effect.

What is claimed is:

1. A rotor for aerating waste water by extending partially into the surface of the water to be aerated and which rotates about a vertical axis of rotation comprising, a plate-shaped member oriented perpendicular to said axis of rotation and a plurality of plate-shaped blades extending from both sides of said plate-shaped member in a direction which is parallel to and radially outwardly spaced from said axis of rotation of said rotor.

2. A rotor according to claim 1 wherein said plate-shaped member includes a recessed portion at its peripheral extent at the leading edge of each said blade.

3. A rotor according to claim 1 wherein said plate-shaped member is positioned above the surface of the water to be aerated and said plate-shaped blades extending downwardly from said plate-shaped member are disposed in the water to be aerated.

4. A rotor according to claim 1 or 3 wherein the width of said plate-shaped portion of each blade extending downwardly from said plate-shaped member decreases from a maximum width at the juncture of said blade and said plate member.

5. A rotor according to claim 1 wherein the plate-shaped portion of each blade extending upwardly from said plate-shaped member blends into a portion bent in the direction of rotation of said rotor.

6. A rotor according to claim 5 wherein said bent portion of each said blade slopes radially inwardly and downwardly from its outer edge to said plate-shaped member.

7. A rotor according to claim 5 wherein said bent portion is attached to said plate-shaped member.

\* \* \* \* \*